$S_1 = S_2$ $S_1 > S_2$ $S_1 = S_2$ $S_1 > S_2$

United States Patent Office 3,533,308
Patented Oct. 13, 1970

3,533,308
TRANSMISSION
Masaaki Noguchi, Nagoya-shi, and Masaharu Sumiyoshi, Toyota-shi, Japan, assignors to Toyota Jidosha Kogyo Kabushiki Kaisha, Aichi-ken, Japan, a corporation of Japan
Filed Dec. 30, 1968, Ser. No. 787,730
Int. Cl. F16h 57/10
U.S. Cl. 74—756       2 Claims

ABSTRACT OF THE DISCLOSURE

The present invention provides an auxiliary transmission for automatic transmissions for motor vehicles for providing four forward speeds and one reverse speed as well as three speeds and one reverse speed. The auxiliary transmission provides a transmission incorporating only a single differential gear set and a single planetary gear set.

The present invention relates to a transmission suitable for use as an auxiliary transmission for automatic transmissions for motor vehicles, which comprises a gear train utilizing differential gears for speed change mechanism, is used especially in combination with a torque converter or a fluid coupling, and provides for four forward speeds and one reverse speed as well as three forward speeds and one reverse speed.

The auxiliary transmission proposed heretofore for use with automatic transmission for motor vehicles which, as an individual unit of gear train, provides for up to four forward speeds and incorporates double-row differential gears. The auxiliary transmission provided with the double-row differential gears has a disadvantage that where engine torque is great, the use of large-diameter shafts is required. Another disadvantage encountered in the prior art device is a difficulty in lubrication to sliding parts and design a swell. This is because since gears are meshed within a gear box, shaft for power transmission from the outside of the gear box to respective gears are partly tripled. For these reasons, such a prior art device is not well suited for use in automatic transmissions.

In contrast thereto, the present invention proposes the transmission incorporating only a single differential gear set and a single-row planetary gear set whereby the purpose of power transmission is fully achieved, eliminating previously-mentioned disadvantages.

Figures 0, 1:
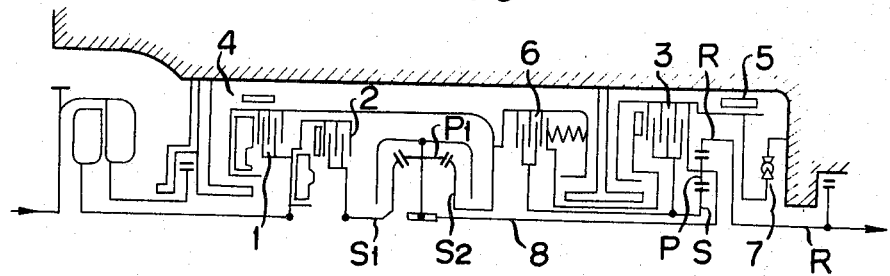
Figure 1A:
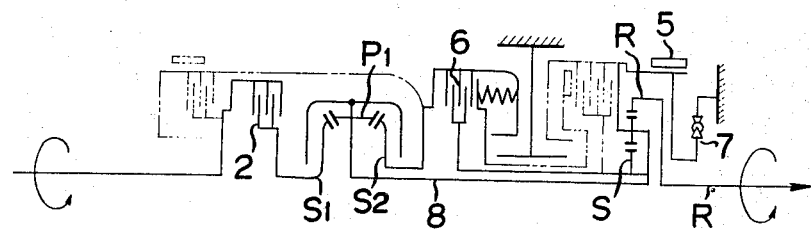
Figure 1B:
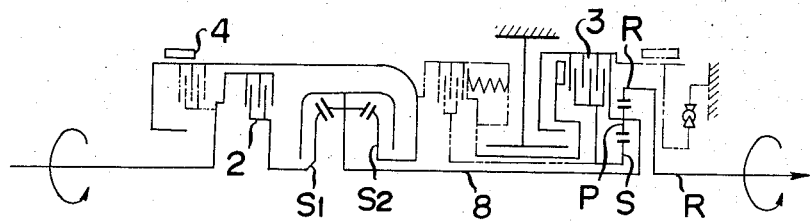
Figure 1C:
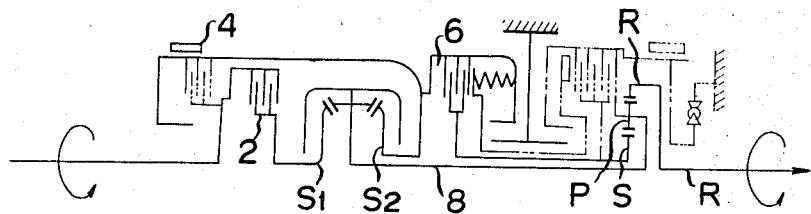
Figure 1D:
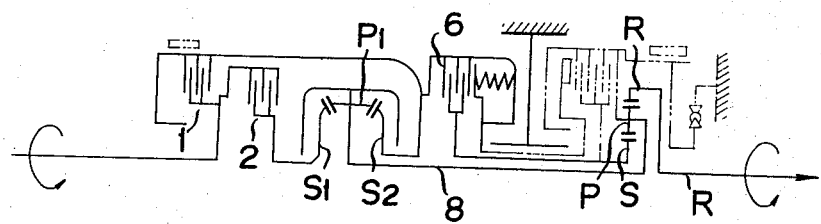
Figure 1E:
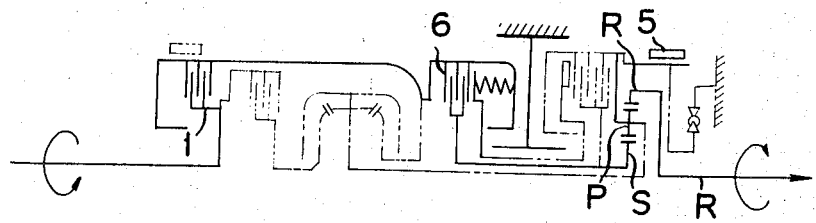
Figure 1F:
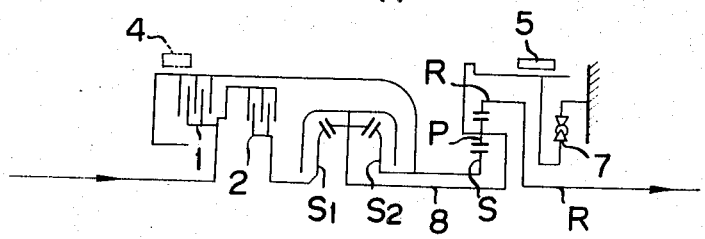
Figure 2:
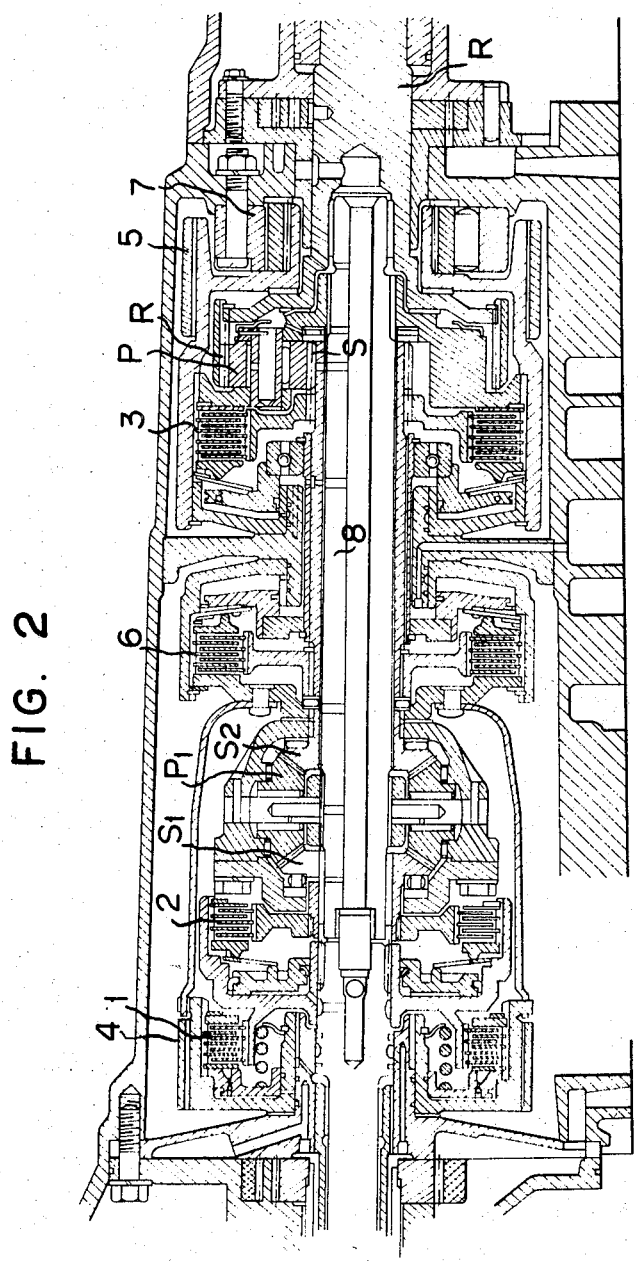
Figure 3J:
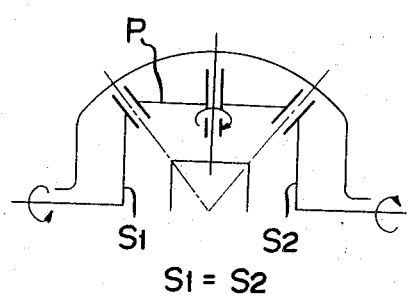
Figure 3L:
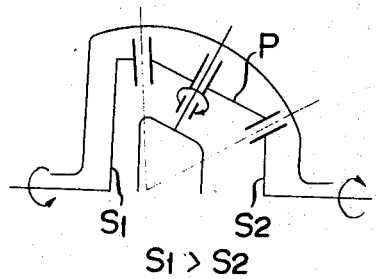
Figure 3K:
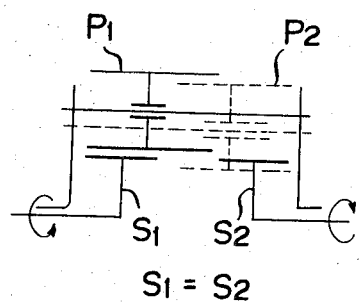
Figure 3M:
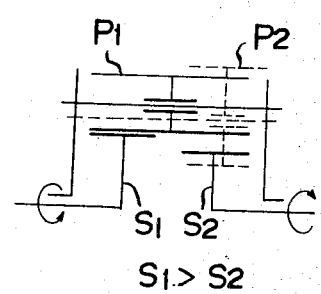
Figure 3N:
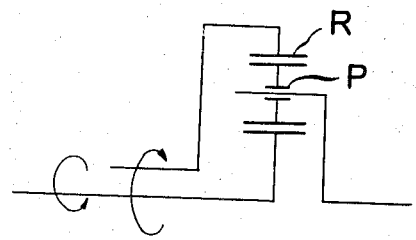

These and other features, objects and advantages of the present invention will become more obvious from the following description when taken in connection with the accompanying drawing, wherein:

FIGS. 1–O and 1–A through 1–F are schematic views showing the principle of operation of the present invention;

FIG. 2 is a longitudinal cross-sectional view of an embodiment of the present invention, which shows the arrangement of a principal operating section of the transmission for passenger cars; and FIGS. 3–J to 3–N are schematic views showing the principle of the differential gears employed in the present invention.

Referring now to the drawing or more particularly to FIGS. 3–J to 3–N thereof wherein the principle of the differential gears used in this invention is illustrated, FIGS. 3–J and 3–K are the principle of the conventional device, where since a gear $S_1$ on the input side and a gear $S_2$ on the output side are equal to each other, the carrier holding a pinion P which is mating with the gears rotates on the axis of rotation by the amount of difference in rotation between the gears $S_1$ and $S_2$. (In the following description, $S_1$, $S_2$ etc. also designate the numbers of teeth of the gears. The difference between the two gears $S_1$ and $S_2$ lies in shape: one is a bevel gear, while the other is a cylindrical gear; and therefore simply by modifying the tooth groove of the former to a spiral and that of the latter to a helical, transmissions using the gears will become much the same in the transmission efficiency, performance, life and cost of manufacture, but have, if any, the tendency that transmissions incorporating the bevel gears are spherical and slender, while those which use the cylindrical gears are short and flat.

FIGS. 3–L and 3–M show input- and output-side gears with different numbers of teeth. The gear shown in FIG. 3–M is employed in a double-row planetary gear set, while the gear shown in FIG. 3–L is a new device proposed in the present invention, which basically has the character of the differential gears as well as that of the single-row planetary gear set shown in FIG. 3–N, which is characterized by the extreme easiness of obtaining the gear ratio that is difficult to obtain by means of planetary gears.

In the case of the single-row planetary gear set shown in FIG. 3–N, the limit of gear ratio of a such gear S and a ring gear R is considered, in general, to be $R/S \geq 1.8$ or $S/R \leq 0.55$ owing to various restrictions such as construction, strength and the minimum possible number of teeth of the pinion P.

In contrast thereto, in the case of the differential gears shown in FIG. 3–L, where sun gears $S_1$ and $S_2$ which are different in the number of teeth, e.g., sun gears of different diameters, are used, the large-diameter sun gear $S_1$ can be mounted closer to the center of gear engagement shown in FIG. 3–J so that the length of the gear box can be shortened by that amount, and the shaft supporting the pinion P which is vertical to the input and output shafts in FIG. 3–J shall be inclined as much as required. From this reason, it is possible to design the gear ratio within the range of $S_1/S_2 = 1.0$ to 2.3 with ease.

Where the gear ratio is over 2.3, the gear arrangement shown in FIG. 3–N is generally more advantageous. In the gear arrangement in FIG. 3–M, the use of sun gears $S_1$ and $S_2$ which are different in the number of teeth shortens the length of the gear box as in the case of the gear arrangement in FIG. 3–L; and consequently, depending upon the module of gears to be employed though, it is advisable to provide a difference of 4 to 5 teeth or more. For the double-row planetary gear set into which these sun gears are assembled and operated, this difference in the number of teeth is an indispensable condition.

However, such a wide range of gear ratio as is shown in FIG. 3–L is not obtainable and the gear ratio $S_1/S_2 = 1.10$ to 1.50 seems to be the limit because the reasonable number of teeth of the sun gears are within the range from 20 to 35 considering space to be occupied, module, strength, and cost of manufacture. This seems to imply that the gear arrangement in FIG. 3–M is involved in the gear arrangement shown in FIG. 3–L and therefore has no reason for being; but in effect it has a reason for being because there is such a case that differential gears must be so designed as to be built in extremely short, limited space.

Table 1 gives for better and easier understanding the position at each speed of each of the control devices including the front clutch 1, rear clutch 2, second speed clutch 3, front band 4, rear band 5, and spring clutch 6. In the table, the symbol "0" indicates "connection" for the clutch and "tightening" for the band, while no symbol expresses "disconnection" and "loosening" respectively. In the case of a one-way clutch 7, the symbol "0" indicates the locked state.

TABLE 1

| Drive position | Front clutch 1 | Rear clutch 2 | Second speed clutch 3 | Front band 4 | Rear band 5 | Spring clutch 6 | One-way clutch 7 |
|---|---|---|---|---|---|---|---|
| Neutral | | | | | | 0 | |
| Start | | 0 | | | | 0 | 0 |
| 1st speed | | 0 | | | 0 | 0 | ¹0 |
| Sudden deceleration: | | | | | | | |
|   1st speed | | 0 | | 0 | | 0 | |
|   2nd speed | | 0 | 0 | 0 | | | |
|   3rd speed | | 0 | | 0 | | 0 | |
|   4th speed | 0 | 0 | | | | 0 | |
| Sudden acceleration: | | | | | | | |
|   (4th speed–3rd speed) | | 0 | | 0 | | 0 | |
|   (3rd speed–2nd speed) | | 0 | 0 | 0 | | | |
|   (2nd speed–1st speed) | | 0 | | | 0 | 0 | |
| Reverse | 0 | | | | 0 | 0 | |

¹ Partial.

OPERATION

The mode of operation of the present invention is as follows:

1st speed (FIG. 1–A)

The rear clutch 2 is connected to rotate the front sun gear $S_1$ and the front pinion $P_1$. Tightened by the rear band 5, a front-rear carrier assembly 8 is in stopped state. Therefore, as the rear clutch 2 and the front sun gear $S_1$ rotate in the clockwise direction, the control sun gear $S_2$ rotates in the counterclockwise direction, rotating the rear sun gear S in the counterclockwise direction through the spring clutch 6. Since the carrier assembly 8 is at a stop, the ring gear and output shaft R rotates clockwise at a predetermined reduction speed ratio. The speed ratio of the output side to the input side is $$1 \Big/ \frac{S_2}{S_1} \cdot \frac{R}{S}$$

When sudden acceleration is made with the gearshift lever shifted from neutral or 2nd to 1st gear, the reaction force is exerted to the carrier assembly 8 in the counterclockwise direction and then the one-way clutch 7 is locked; and accordingly it is not necessary to tighten the rear band 5. On sudden deceleration, however, tightening the rear band 5 is required because the carrier assembly 8 rotates clockwise, otherwise, the engine will overrun, resulting in failure of engine brake application. When driving at the first speed only, the rear band 5 is tightened and therefore, in this state, the one-way clutch receives part of load.

2nd speed (FIG. 1–B)

The rear clutch 2 is connected to rotate the front sun gear $S_1$. At the same time, the front band 4 is tightened to connect the second-speed clutch 3 and on the other hand to release the spring clutch 6. In this state, the control sun gear $S_2$ alone is stationary.

When the front sun gear $S_1$ revolves in the clockwise direction, the carrier assembly 8 tends to make normal rotation in the clockwise direction also, because the control sun gear $S_2$ is stationary; but since the carrier assembly 8 is connected with the rear sun gear S through the second-speed clutch 3, the rear pinion P is not meshed and makes no revolution itself. Thus the pinion revolves together with the ring gear and output shaft R.

The speed ratio of the output side to the input side is $$1 \Big/ \left(1 + \frac{S_2}{S_1}\right)$$

3rd speed (FIG. 1–C)

In this position, the second-speed clutch 3 is released and the spring clutch 6 is connected in addition to the state of the second gear arrangement. (The spring clutch 6 is released at the second speed only; that is, at other speeds, it is connected at all times.) Since the control sun gear $S_2$ and the rear sun gear S are stationary, the carrier assembly 8 rotates clockwise if the front sun gear $S_1$ rotates clockwise; and at the same time, since the carrier assembly 8 is rotating around the rear sun gear S, the ring gear and output shaft R is overdriven relative to the carrier assembly 8.

The speed ratio of the output side to the input side is $$\left(1 + \frac{S}{R}\right) \Big/ \left(1 + \frac{S_2}{S_1}\right) = 1 \Big/ \left(1 + \frac{S_2}{S_1}\right)\left(\frac{1}{1 + \frac{S}{R}}\right)$$

4th speed (FIG. 1–D)

In this position, the front clutch 1, the rear clutch 2, and the spring clutch 6 are connected, while the front band 4 and the rear band 5 are released. Since the front clutch 1 and the rear clutch 2 are connected, the front pinion $P_1$ cannot rotate.

Therefore, $S_1$, $P_1$ $S_2$ and the carrier assembly 8 tend to rotate as one unit, but, since the rear pinion P in the rear side planetary gear set can not make rotation as in the case of the the third-speed position, the ring gear and output shaft R rotates at the same speed of the input shaft. The input and output shaft speed ratio is 1:1.

Reverse (FIG. 1–E)

In this position, the front clutch 1 and the spring clutch 6 are connected to rotate the control sun gear $S_2$ and the rear sun gear S, while the rear band 5 is tightened to stop the carrier assembly 8.

As the front clutch 1 is connected, the control sun gear and the rear sun gear rotate clockwise but the carrier assembly 8 is stationary; and therefore, the ring gear and output shaft R rotates counterclockwise.

The speed ratio of the output side to the input side is $$-1 \Big/ \frac{R}{S}$$

Giving a set of $S_2/S_1$, $R/S$ from the above result determines the value of each of the first, second and third speeds. When the value of $S_2/S_1$ is 1, the pinion shaft is positioned at a right angle to the drive shaft and the first and reverse speed reduction ratios become equal. Generally, however, $$\frac{S_2}{S_1} > 1 \text{ or } \frac{S_2}{S_1} < 1$$

is selected, that is, both the drive shaft and the pinion shaft can be mounted $90° \pm \alpha$ inclined, to provide a larger or smaller first-speed reduction gear ratio than the reverse speed reduction gear ratio. Accordingly an adequate speed ratio shall be selected in accordance with the purpose of use.

The following examples show the numerical value of speed ratio that can be obtained by this gear train.

(1) When combined with a torque converter (for use in large buses for example)

$$\frac{S_2}{S_1} = 1, \frac{R}{S} = 3.4$$

1st speed=3.40, 2nd speed=2.00, 3rd speed=1.55, 4th speed=1, and reverse =−3.40.

(2) When combined with a torque converter (for use in passenger cars for example)

$$\frac{S_2}{S_1}=0.9, \frac{R}{S}=3$$

1st speed=2.70, 2nd speed=1.90, 3rd speed=1.42, 4th speed=1, reverse=−3.00.

$$\frac{S_2}{S_1}=1.15, \frac{R}{S}=2.6$$

1st speed=2.99, 2nd speed=2.15, 3rd speed=1.55, 4th speed=1, and reverse=−2.60.

(3) When combined with a fluid coupling (for use in passenger cars for example)

$$\frac{S_2}{S_1}=1, \frac{R}{S}=3.5$$

1st speed=3.50, 2nd speed=2.00, 3rd speed=1.56, 4th speed=1, and reverse=−3.50.

In this gear train, selection up to the fourth forward speed is possible but may be stopped at the third forward speed as illustrated in FIG. 1–F. When omitting the second speed gear from the four forward speed gears, the second speed clutch 3 and the spring clutch 6 are to be omitted and the control sun gear $S_2$ and the rear sun gear S connected directly.

In the above examples, the clutches 6 and 3 are connected and the clutch 6 is operated merely by actuating the clutch 3 with servo hydraulic pressure. In the present invention, however, it is not necessary to connect these two clutches 3 and 6, and, for example, each of the clutches can be operated with a separate servo hydraulic pressure, so that the servo pressure can actuate these clutches according to each of the aforementioned driving positions to obtain the desired speed. If the clutches 3 and 6 are coupled, however, only one servo hydraulic system will be required for the clutches, which will decrease the number of component parts, facilitate manufacture, cut the cost, and make the transmission smaller in size.

What is claimed is:
1. A transmission which comprises
an input shaft;
a differential means having a sun gear on each side of a planetary gear;
an intermediate shaft;
a planetary gear set;
an output shaft;
a casing concentrically including the input shaft, the intermediate shaft, the output shaft, the differential means and the planetary gear set;
a first clutch means to connect one of said sun gears of the differential means to the input shaft;
a means to connect the other sun gear of the differential means to a sun gear of the planetary gear set;
a second clutch means provided between said other sun gear and the input shaft;
a first brake means provided between said other sun gear and the casing;
the planetary gear of the differential means being connected to a planetary gear of the planetary gear set;
a second brake means provided between the planetary gear of the differential means and the casing;
a means to connect a ring gear of the planetary gear set to the output shaft;
said clutches and break means being selectively actuated to obtain at the output shaft the speed reducing ratios of forward three speeds and reverse one speed, respectively.

2. A transmission which comprises
an input shaft;
a differential means having a sun gear on each side of a planetary gear;
an intermediate shaft;
a planetary gear set;
an output shaft;
a casing concentrically including the input shaft, the intermediate shaft, the output shaft, the differential means and the planetary gear set;
a first clutch means to connect one of said sun gears of the differential means to the input shaft;
a third clutch means to connect the other sun gear of the differential means to a sun gear of the planetary gear set;
a second clutch means provided between said other sun gear and the input shaft;
a first brake means provided between said other sun gear and the casing;
the planetary gear of the differential means being connected to a planetary gear of the planetary gear set;
a second brake means provided between the planetary gear of the differential means and the casing;
a fourth clutch means provided between the sun gear and the planetary gear of the planetary gear set;
a means to connect a ring gear of the planetary gear set to the output shaft;
said clutches and brake means being selectively actuated to obtain at the output shaft the speed reducing ratio of forward four speeds and reverse one speed, respectively.

References Cited

UNITED STATES PATENTS

| 1,870,076 | 8/1932 | Thomson | 74—765 X |
| 2,749,775 | 6/1956 | Simpson | 74—763 X |
| 2,873,624 | 2/1959 | Simpson | 74—759 |
| 2,886,983 | 5/1959 | Miller | 74—759 |
| 3,031,901 | 5/1962 | Simpson | 74—759 |
| 3,446,095 | 5/1969 | Bookout | 74—763 |

FOREIGN PATENTS 63,940   5/1955   France.

DONLEY J. STOCKING, Primary Examiner

THOMAS C. PERRY, Assistant Examiner

U.S. Cl. X.R.

74—759, 763